(12) United States Patent
Lee

(10) Patent No.: US 9,763,126 B2
(45) Date of Patent: Sep. 12, 2017

(54) ELECTRONIC DEVICE AND METHOD FOR PROCESSING PACKET IN INTERNET PROTOCOL-BASED NETWORK

(71) Applicant: Samsung Electronics Co., Ltd., Suwon-si, Gyeonggi-do (KR)

(72) Inventor: Jin-Suk Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 71 days.

(21) Appl. No.: 14/804,777

(22) Filed: Jul. 21, 2015

(65) Prior Publication Data

US 2016/0021674 A1 Jan. 21, 2016

(30) Foreign Application Priority Data

Jul. 21, 2014 (KR) ........................ 10-2014-0091756

(51) Int. Cl.
*H04W 4/00* (2009.01)
*H04W 24/08* (2009.01)
*H04L 1/00* (2006.01)
*H04W 28/22* (2009.01)
*H04L 1/18* (2006.01)

(52) U.S. Cl.
CPC ........... *H04W 24/08* (2013.01); *H04L 1/0002* (2013.01); *H04W 28/22* (2013.01); *H04L 1/1867* (2013.01)

(58) Field of Classification Search
CPC combination set(s) only.
See application file for complete search history.

(56) References Cited

U.S. PATENT DOCUMENTS

| | | | |
|---|---|---|---|
| 6,366,763 B1 * | 4/2002 | Ue | H04L 1/0002 455/522 |
| 7,515,548 B2 * | 4/2009 | Chandra | H04W 24/00 370/252 |
| 8,289,952 B2 * | 10/2012 | Larsson | H04L 1/0003 370/328 |
| 9,253,238 B2 * | 2/2016 | Khay-Ibbat | H04L 65/602 |
| 2008/0025300 A1 * | 1/2008 | Lide | H04L 29/06027 370/389 |
| 2014/0036048 A1 | 2/2014 | Furbeck | |
| 2014/0059238 A1 | 2/2014 | Mela et al. | |

* cited by examiner

*Primary Examiner* — Frank Duong
(74) *Attorney, Agent, or Firm* — Jefferson IP Law, LLP

(57) ABSTRACT

An electronic device and method for processing a packet in an Internet Protocol (IP)-based network are provided. The method performed in an electronic device includes determining a network condition from a received signal, setting one of reference values set for corresponding network conditions as a transmission rate for the determined network condition, and transmitting the packet at the transmission rate.

16 Claims, 9 Drawing Sheets

ELECTRONIC DEVICE AND METHOD FOR PROCESSING PACKET IN INTERNET PROTOCOL-BASED NETWORK

CROSS-REFERENCE TO RELATED APPLICATION(S)

This application claims the benefit under 35 U.S.C. §119(a) of a Korean patent application filed on Jul. 21, 2014 in the Korean Intellectual Property Office and assigned Serial number 10-2014-0091756, the entire disclosure of which is hereby incorporated by reference.

TECHNICAL FIELD

The present disclosure relates to an electronic device and method for processing a packet in an Internet Protocol-based network.

BACKGROUND

Long Term Evolution (LTE) technologies, called fourth generation (4G) mobile communication, have rapidly spread around the globe. The LTE technology may provide various real-time data services over Internet Protocol (IP)-based networks. The services may include Voice over LTE (VoLTE) services, Video Telephony over LTE (VT) services, Voice over Internet Protocol (VoIP) services, and the like.

While a call service based on packet data is performed, transmission of the packet data may be delayed or lost depending on the network condition. In this case, the quality of the call service may degrade.

To improve the degraded quality of the call service, a bitrate for packet transmission may be controlled or the delayed or lost packet data may be transmitted again, which is, however, only a follow-up measure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and method for processing a packet in an Internet Protocol (IP)-based network, which determines a network condition and controls the bitrate or retransmits packet data before the quality of a call service degrades.

In accordance with an aspect of the present disclosure, a method for processing a packet in an electronic device in an IP-based network is provided. The method includes determining a network condition from a received signal, setting one of reference values set for corresponding network conditions as a transmission rate for the determined network condition, and transmitting a packet at the transmission rate.

In accordance with another aspect of the present disclosure, an electronic device is provided. The electronic device includes a processor configured to determine a network condition from a received signal, and to set one of reference values set for corresponding network conditions as a transmission rate for the determined network condition, and a communication module configured to transmit a packet at the transmission rate.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
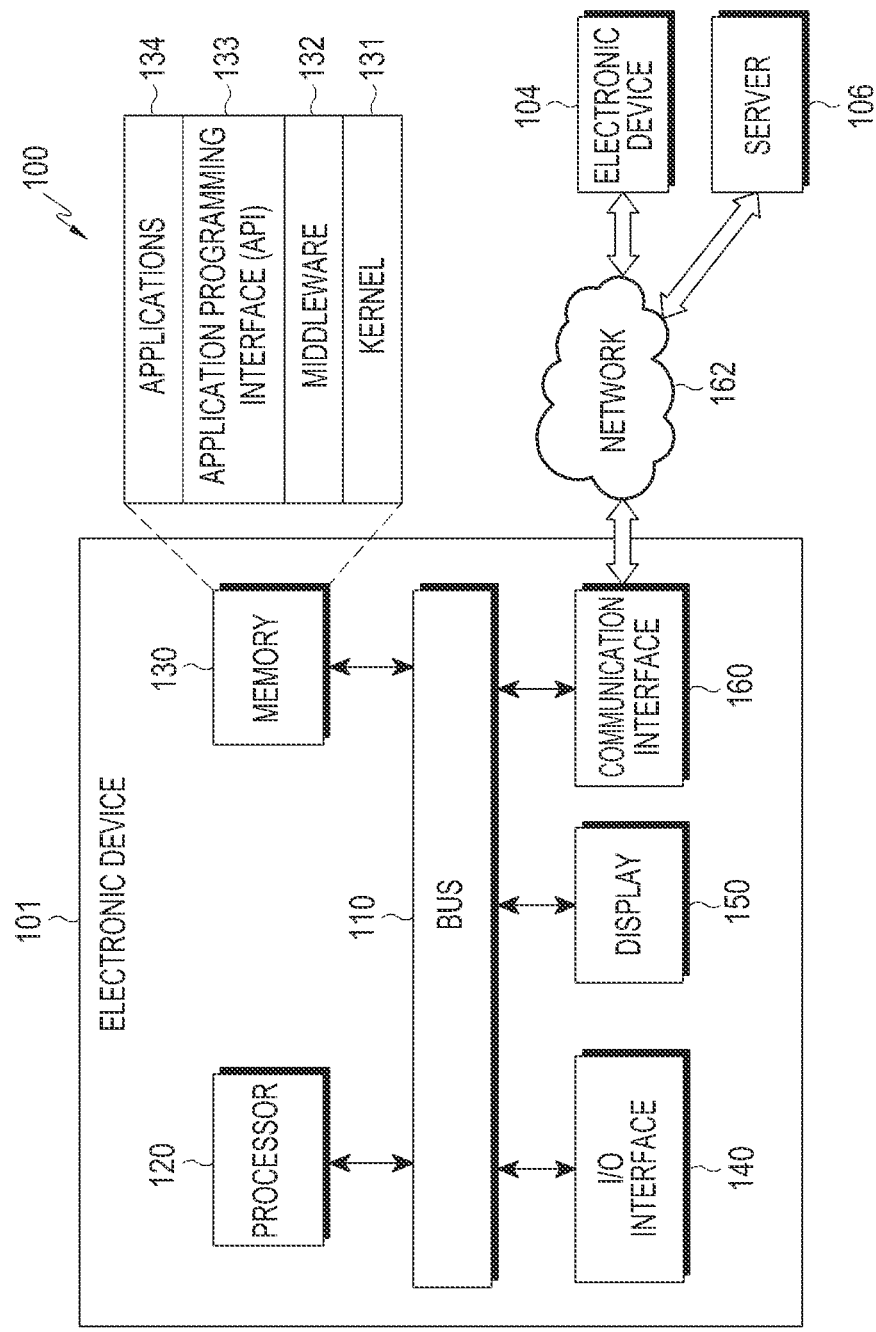
FIG. 1 illustrates a network environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments of the disclosure may, however, be embodied in many different forms and should not be construed as limited to the embodiments set forth herein; rather, these embodiments are provided so that this disclosure will be thorough and complete, and will fully convey the scope of the embodiments of the disclosure to those skilled in the art. Like numbers refer to like elements throughout.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For examples, "A or B" may include A, or include B, or include both A and B.

Ordinal numbers as used herein, such as "first", "second", and the like, may modify various components of various embodiments, but do not limit those components. For example, these terms do not limit order and/or importance of corresponding elements, components, regions, layers and/or sections. These terms are only used to distinguish one element, component, region, layer or section from another region, layer or section. For example, a first user device and a second user device refers to two different user devices. Thus, a first element, component, region, layer or section discussed below could be termed a second element, component, region, layer or section without departing from the teachings of the embodiments of the present disclosure.

When the term "connected" or "coupled" is used, a component may be directly connected or coupled to another component or may be indirectly connected or coupled to another component via another new component. However, if a component is said to be "directly connected" or "directly coupled" to another component, it should be interpreted as literally as it says.

The terminology used herein is for the purpose of describing particular embodiments only and is not intended to be limiting of the embodiments of the present disclosure.

It is to be understood that the singular forms "a," "an," and "the" include plural references unless the context clearly dictates otherwise.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device to which various embodiments of the present disclosure may be applied may include a communication functionality. For example, the electronic device may include at least one of smart phones, tablet Personal Computers (PCs), mobile phones, video phones, e-book readers, desktop PCs, laptop PCs, netbook computers, Personal Digital Assistants (PDAs), Portable Multimedia Players (PMPs), Moving Picture Experts Group (MPEG-1 or MPEG-2) Audio Layer III MP3 players, mobile medical devices, cameras, and wearable devices (e.g., Head-Mounted Devices (HMDs), such as electronic glasses, electronic clothes, electronic bracelets, electronic necklaces, electronic appcessories, electronic tattoos, or smart watches).

In some embodiments, the electronic device may be a smart home appliance having the communication capability. The smart home appliance may include at least one of, for example, televisions, Digital Video Disc (DVD) players, audio systems, refrigerators, air conditioners, cleaning machines, ovens, microwaves, washing machines, air purifiers, set-top boxes, TV sets (e.g., Samsung HomeSync™, Apple TV™, or Google TV™), game consoles, electronic dictionaries, electronic keys, camcorders, and electronic albums.

In some embodiments, the electronic device may include at least one of a variety of medical equipment (e.g., a Magnetic Resonance Angiography (MRA) device, a Magnetic Resonance Imaging (MRI) device, a Computed Tomography (CT) device, a photographing device, an ultrasonic device, and the like), navigation devices, Global Positioning System (GPS) receivers, Event Data Recorders (EDRs), Flight Data Recorders (FDRs), car infotainment devices, marine electronic devices (e.g., marine navigation systems, gyro-compass, and the like), avionics, security devices, car head units, industrial or home robots, banking agency's Automatic Teller Machines (ATMs), or Point of Sales (POSs) for shops.

In some embodiments, the electronic device may include at least one of a part of the furniture or building/structure with a communication capability, electronic boards, electronic signature receiving devices, projectors, or various instrumental equipment (e.g., meters for water, electricity, gas, or radio waves). The electronic device in accordance with various embodiments of the present disclosure may be one or more combinations of the aforementioned devices. In addition, the electronic device in accordance with various embodiments of the present disclosure may be a flexible device. It will be obvious to a person of ordinary skill in the art that the electronic device is not limited to the aforementioned examples. The term 'user' as herein used may refer to a person who uses the electronic device or a device (e.g., an artificially intelligent device) that uses the electronic device.

An electronic device and method for processing packets in an Internet Protocol (IP)-based network in accordance with various embodiments will be described in connection with accompanying drawings.

FIG. 1 illustrates a network environment according to an embodiment of the present disclosure.

Referring to FIG. 1, a network environment 100 may include an electronic device 101, external electronic devices, such as an electronic device 104 and a server 106, and a network 162 that connects the electronic devices 101 and 104 or 106.

The electronic device 101 may include at least one of a bus 110, a processor 120, a memory 130, an input/output (I/O) interface 140, a display 150, and a communication interface 160, but is not limited thereto.

The bus 110 may be a means for interconnecting the enumerated components and delivering communications (e.g., control messages) among them.

The processor 120 may, for example, receive requests or commands from the enumerated components, for example, the memory 130, the I/O interface 140, the display 150, the communication interface 160, and the like, via the bus 110, interpret the requests or commands, and perform an operation or data processing according to the interpreted request or command.

The memory 130 may store requests, commands, or data received or generated from the enumerated components, for example, the processor 120, the I/O interface 140, the display 150, the communication interface 160, and the like. The memory 130 may include, for example, programming modules, such as kernel 131, middleware 132, Application Programming Interface (API) 133, application 134, and the like. Each of the programming modules may be implemented in software, firmware, hardware, or two or more combinations thereof.

The kernel 131 may control and/or manage system resources (e.g., the bus 110, the processor 120, the memory 130, and the like) to be used to carry out an operation or function implemented by the other programming modules, for example, the middleware 132, the API 133, or the application 134. Furthermore, the kernel 131 may provide an interface for the middleware 132, the API 133, or the application 134 to access respective components of the electronic device 101 to control or manage them.

The middleware 132 may act as intermediary for the API 133 or the application 134 to communicate data with the kernel 131. In addition, the middleware 132 may perform control operations (e.g., scheduling or load balancing) in response to a task request received from the application 134 by way of, for example, placing a high priority on at least one application included in the application 134 to use system resources (e.g., the bus 110, the processor 120, the memory and the like) of the electronic device 101.

The API 133 is an interface for the application 134 to control a function provided from the kernel 131 or the middleware 132, and may include at least one interface or function (e.g., an instruction) for file control, window control, image processing, text control, and the like.

In accordance with various embodiments, the application 134 may include a Short Message Service (SMS)/Multimedia Messaging Service (MMS) application, an email application, a calendar application, an alarm application, a healthcare application (e.g., an application for measuring quantity of motion or blood sugar), or an environmental information application (e.g., an application for providing atmospheric pressure, humidity, or temperature). Additionally or alternatively, the application 134 may be an application involved in information exchange between the electronic device 101 and an external electronic device 104. The application involved in such information exchange may include, for example, a notification relay application for relaying particular information to the external electronic device 104 or a device management application for managing the external electronic device 104.

For example, the notification relay application may include a functionality for notifying the external electronic device 104 of notification information generated in any other application (e.g., the SMS/MMS application, the email application, the healthcare application, or the environmental information application) of the electronic device 101. Additionally or alternatively, the notification relay application may, for example, receive the notification information from the external electronic device 104 and provide the notification information to the user. The device manager application may manage (e.g., install, delete or update) a function (e.g., turning on/off the external electronic device 104 or a part of the external electronic device 104, or controlling display brightness of the external electronic device 104) with respect to part of the external electronic device 104 in communication with the electronic device 101, or a service (e.g., calling or messaging service) provided by the external electronic device 104 or an application running in the external electronic device 104.

In accordance with various embodiments of the present disclosure, the application 134 may include an application designated depending on an attribute of the electronic device 104, for example, on a type of the electronic device 104. For example, in case the external electronic device 104 is an MP3 player, the application 134 may include an application related to music replay. Similarly, in case the external electronic device 104 is a mobile medical device, the application 134 may include an application related to healthcare. In accordance with an embodiment, the application 134 may include at least one of an application dedicated to the electronic device 101 and an application received from the external electronic device 104 or the server 106.

The I/O interface 140 may deliver instructions or data entered by the user through the I/O device (e.g., a sensor, a keyboard, or a touch screen) to the processor 120, the memory 130, or the communication interface 160 via the bus 110. For example, the I/O interface 140 may provide data for a user touch input through the touch screen to the processor 120. The I/O interface 140 may also output a command or data received from the processor 120, the memory 130, or the communication interface 160 via the bus 110 through the I/O device (e.g., a speaker or the display 150). For example, the I/O interface 140 may output sound data processed by the processor 120 to the user.

The display 150 may display a variety of information (e.g., multimedia data or text data) for the user. In accordance with an embodiment of the present disclosure, the display 150 may display recommendation data.

The communication interface 160 may connect communication between the electronic device 101 and the external electronic device 104 or the server 104.

For example, the communication interface 160 may be connected to a network 162 through wired or wireless communication and may communicate with the external electronic device 104 or the server 106. The wireless communication may include at least one of Wi-Fi, BT, Near Field Communication (NFC), GPS, Bluetooth Low Energy (BLE) and cellular communication (e.g., LTE, LTE-A, CDMA, WCDMA, UMTS, Wibro or GSM). The wired communication may include at least one of, for example, Universal Serial Bus (USB), High Definition Multimedia Interface (HDMI), Recommended Standard (RS) 232 and Plain Old Telephone Service (POTS).

In accordance with an embodiment, the network 162 may be a telecommunications network. The telecommunications network may include at least one of computer network, Internet, Internet of things, and telephone network. In accordance with an embodiment, a protocol (e.g., a transport layer protocol, a data link layer protocol or a physical layer protocol) for communication between the electronic device 101 and the external device 104 or the server 106 may be supported by at least one of the application 134, the API 133, the middleware 132, the kernel 131 and the communication interface 160.

Figure 2:
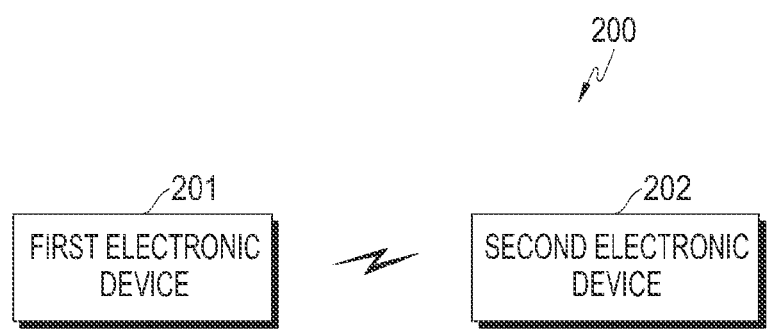
FIG. 2 illustrates communications between electronic devices according to an embodiment of the present disclosure.

FIG. 2 illustrates communications between electronic devices according to an embodiment of the present disclosure.

Referring to FIG. 2, a network environment 200 may include first and second electronic devices 201 and 202, each performing terminal-to-terminal communications. For example, the first and second electronic devices 201 and 202 may exchange, for example, real-time data. The real-time data as used herein may refer to a Real-Time Transport Protocol (RTP) packet using the RTP protocol. Using the RTP packet, IP-based real-time voice/video call services, multimedia streaming services, and the like may be performed between the first and second electronic devices 201 and 202.

Figure 3:
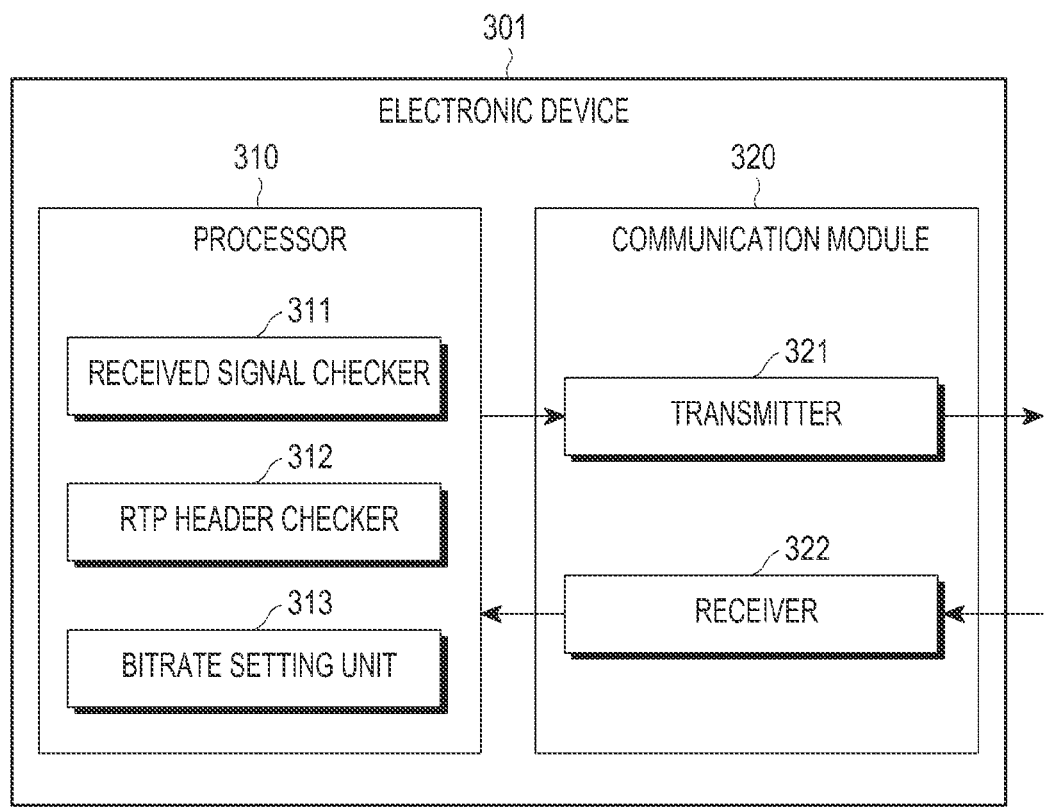
FIG. 3 illustrates an electronic device according to an embodiment of the present disclosure.

FIG. 3 illustrates an electronic device according to an embodiment of the present disclosure.

Referring to FIG. 3, an electronic device 301 may include a processor 310 and a communication module 320.

The processor 310 may include a received signal checker 311, an RTP header checker 312, and a bitrate setting unit 313, and control general operations of the electronic device 301. In accordance with various embodiments of the disclosure, the processor 310 may determine the strength of a received signal checked by the received signal checker 311. The processor 310 may determine a network condition based on the received signal.

In accordance with various embodiments of the present disclosure, the processor 310 may determine a network condition by taking into account not only the strength of a signal received by the electronic device 301 receives but also the strength of a received signal included in an RTP header received from another external electronic device.

The received signal checker 311 may measure the strength of a signal received by the electronic device 301. The received signal may include at least one of Reference Signal Received Power (RSRP), Reference Signal Received Quality (RSRQ), Signal to Interference plus Noise Ratio (SINR) and Received Signal Strength Indicator (RSSI). Furthermore, the received signal may be a signal received as a result of the electronic device 301 performing communication with another electronic device, for example, the electronic device 104, or any received signal from which a network condition may be inferred. The received signal checker 311 may deliver a measurement of the received signal to the processor 310.

The RTP header checker 312 may check an RTP header received from another electronic device. In accordance with various embodiments of the present disclosure, the RTP header received may include an indicator indicating that a received signal received by an electronic device that transmitted the RTP header or information about the received signal is included, or the strength of the received signal. The RTP header checker 312 may determine a value of the received signal by checking a header extension area of the received RTP header, if the RTP header indicates that it includes the received signal or information about the received signal. The RTP header checker 312 may deliver the determined value of the received signal to the processor 310.

The bitrate setting unit 313 may set a bitrate based on the network condition determined by the processor 310. In accordance with various embodiments of the present disclosure, the processor 310 may classify the network condition into a strong electric field, a medium electric filed, a weak electric field, and the like, based on the strength of the received signal. For example, the network condition may be classified as represented in Table 1 based on the type or strength of the received signal.

Table 1 represents network conditions classified based on the type or strength of the received signal, in accordance with various embodiments of the present disclosure.

TABLE 1

|  | RSRP(dBm) | RSRQ(dBm) | SINR(dBm) |
| --- | --- | --- | --- |
| Strong Electric Filed | −50~−70 | −2~−7 | 25~30 |
| Medium Electric Field | −70~−85 | −7~−13 | 15~25 |
| Weak Electric Field | <−85 | <−13 | <15 |

As the network condition is determined based on the strength of the received signal, the bitrate setting unit 313 may set a bitrate to correspond to the determined network condition by referring to a reference value. The reference value may include a size of an RTP payload based on a particular bitrate per codec. The reference value may also include a size of the RTP payload for the bitrate determined beforehand based not only on the particular codec but also on other factors, such as a scheme for compressing an RTP packet, RTP payload processing mode, and the like.

For example, as an example of the reference value for an Adaptive Multi-Rate Wideband (AMR-WB) codec, mode of bitrates and size of the RTP payload allowed to be transmitted at each bitrate are represented in Table 2 and Table 3 as follows.

Table 2 represents computation values for an occasion where bandwidth of the AMR-WB codec is AS (Computation of b=AS for AMR-WB (IPv6, ptime=20, bandwidth-efficient mode).

TABLE 2

| Mode | 6.6 | 8.85 | 12.65 | 14.25 | 15.85 | 18.25 | 19.85 | 23.05 | 23.85 | SID |
| --- | --- | --- | --- | --- | --- | --- | --- | --- | --- | --- |
| Bits per speech frame | 132 | 177 | 253 | 285 | 317 | 365 | 397 | 461 | 477 | 40 |
| Payload header and T° C. | 10 | 10 | 10 | 10 | 10 | 10 | 10 | 10 | 10 | 10 |
| RTP payload (bits) | 142 | 187 | 263 | 295 | 327 | 375 | 407 | 471 | 487 | 50 |
| RTP payload (bytes) | 17.75 | 23.38 | 32.88 | 36.88 | 40.88 | 46.88 | 50.88 | 58.88 | 60.875 | 6.25 |
| Rounded-up RTP payload (bytes) | 18 | 24 | 33 | 37 | 41 | 47 | 51 | 59 | 61 | 7 |
| Rounded-up RTP payload (bits) | 144 | 192 | 264 | 296 | 328 | 376 | 408 | 472 | 488 | 56 |
| RTP header | 96 | 96 | 96 | 96 | 96 | 96 | 96 | 96 | 96 | 96 |
| UDP header | 64 | 64 | 64 | 64 | 64 | 64 | 64 | 64 | 64 | 64 |
| IPv6 header | 320 | 320 | 320 | 320 | 320 | 320 | 320 | 320 | 320 | 320 |
| Total bits per 20 ms | 624 | 672 | 744 | 776 | 808 | 856 | 888 | 952 | 968 | 536 |
| Total bit-rate (kbps) | 31.2 | 33.6 | 37.2 | 38.8 | 40.4 | 42.8 | 44.4 | 47.6 | 48.4 | 26.8 |
| AS | 32 | 34 | 38 | 39 | 41 | 43 | 45 | 48 | 49 | N/A |

Table 3 represents computation values for an occasion where bandwidth of the AMR-WB codec is AS (Computation of b=AS for AMR-WB (IPv6, ptime=20, object-aligned mode).

TABLE 3

| Mode | 6.6 | 8.85 | 12.65 | 14.25 | 15.85 | 18.25 | 19.85 | 23.05 | 23.85 | SID |
|---|---|---|---|---|---|---|---|---|---|---|
| Bits per speech frame | 132 | 177 | 253 | 285 | 317 | 365 | 397 | 461 | 477 | 40 |
| Speech frame size (bytes) | 16.5 | 22.13 | 31.63 | 35.63 | 39.63 | 45.63 | 49.63 | 57.63 | 59.625 | 10 |
| Rounded-up speech frame size (bytes) | 17 | 23 | 32 | 36 | 40 | 46 | 50 | 58 | 60 | 5 |
| Rounded-up speech frame size (bits) | 136 | 184 | 256 | 288 | 320 | 368 | 400 | 464 | 480 | 40 |
| Payload header and T° C. | 16 | 16 | 16 | 16 | 16 | 16 | 16 | 16 | 16 | 16 |
| RTP payload (bits) | 152 | 200 | 272 | 304 | 336 | 384 | 416 | 480 | 496 | 56 |
| RTP header | 96 | 96 | 96 | 96 | 96 | 96 | 96 | 96 | 96 | 96 |
| UDP header | 64 | 64 | 64 | 64 | 64 | 64 | 64 | 64 | 64 | 64 |
| IPv6 header | 320 | 320 | 320 | 320 | 320 | 320 | 320 | 320 | 320 | 320 |
| Total bits per 20 ms | 632 | 680 | 752 | 784 | 816 | 864 | 896 | 960 | 976 | 536 |
| Total bit-rate (kbps) | 31.6 | 34 | 37.6 | 39.2 | 40.8 | 43.2 | 44.8 | 48 | 48.8 | 26.8 |
| AS | 32 | 34 | 38 | 40 | 41 | 44 | 45 | 48 | 49 | N/A |

Assume that a bitrate of the electronic device 301 is set within a range of 6.6 kbps~23.85 kbps as represented in Tables 2 and 3 in accordance with various embodiments of the present disclosure.

In a case Robust Header Compression (RoHC) is used as an example of the RTP header compression scheme, the bitrate setting unit 313 may set a bitrate by referring to Table 3. The bitrate setting unit 313 may set a bitrate on a Quality of Service (QoS) basis in the beginning of the connection. It is now assumed that the bitrate is set to about 23.85 kbps on the QoS basis.

Referring to FIG. 3, the size of an RTP payload allowed to be transmitted at about 23.85 kbps may be about 496 bits. Accordingly, in order to process the RTP payload, bandwidth having at least more than about 496 bits may be allocated. Referring to FIG. 3, bandwidth required for transmission at the bitrate of about 23.85 kbps may be about 49 kbps of the AS. If it is determined that the current network condition corresponds to the weak electric field, the bitrate setting unit 313 may set a bitrate to about 6.6 kbps.

For example, with the bitrate set to about 6.6 kbps, the electronic device 301 may transmit as many an RTP payload as 152 bits a time. Referring to FIG. 3, the bandwidth required for transmission at the bitrate of about 6.6 kbps may be about 32 kbps.

For example, as the bitrate is set to about 23.85 kbps, a voice packet may include an RTP header field, a User Datagram Protocol (UDP) header field, and an IPv6 header field, which may be allocated about 96 bits, 64 bits, and 32 bits, respectively. The electronic device 301 may transmit as many packets as a total of about 976 bits by including about 496 bits of payload required per packet in addition to 480 bits of basic overhead.

In this regard, if the bitrate for transmission is reduced to about 6.6 kbps, it means that bandwidth unnecessary for transmission is further allocated, thereby leading to a waste of bandwidth.

In accordance with various embodiments of the present disclosure, the electronic device 301 may transmit the RTP payload as many times as possible within the range of allocated bandwidth. For example, with bandwidth having about 496 bits allocated, an RTP payload having the size of about 152 bits may be transmitted at least three times.

In accordance with various embodiments of the present disclosure, the electronic device 301 may reduce the bitrate for the sampled voice packet to about 6.6 kbps, integrates payloads of three voice packets into a single RTP packet by means of Adaptive Multi-Rate (AMR) bundling of the payloads of the voice packets, and transmit the RTP packet including the three payloads at intervals of 20 ms.

For example, the three voice packets may be repeatedly transmitted in the preallocated bandwidth just in case some packets are lost in the middle of the transmission.

The communication module 320 may include a transmitter 321 and a receiver 322.

The transmitter 321 may transmit the RTP packet to the outside. The RTP packet may include an RTP header and an RTP payload. The RTP header as herein used may include data fields having a strength of the received signal and an indicator indicating that the strength of the received signal is included in the RTP header.

The receiver 322 may receive an RTP packet from an external electronic device. In accordance with various embodiments of the present disclosure, the RTP packet received by the receiver 322 may include an RTP header. The RTP header may include data fields having a strength of the received signal and an indicator indicating that the strength of the received signal is included in the RTP header.

For example, in accordance with various embodiments of the present disclosure, an electronic device may include a processor for determining a network condition from a received signal and setting one of reference values set for corresponding network conditions as a transmission rate for the determined network condition; and a communication module for transmitting the packet at the transmission rate.

In accordance with various embodiments of the present disclosure, the processor may control the communication module to retransmit the packet at least one time if the packet is allowed to be retransmitted within the preallocated bandwidth. The preallocated bandwidth may be set in advance on the QoS basis. The reference value may include a value of the bitrate for the packet, which may be set to correspond to a bitrate and a codec.

In accordance with various embodiments of the present disclosure, the processor may determine the strength of a received signal of a second electronic device from a signal transmitted from the second electronic device through the communication module, and determine a network condition by taking into account the determined strength of the received signal of the second electronic device as well as the strength of a signal received from the second electronic device.

In various embodiments, the processor may insert information about the strength of the received signal from the second electronic device to a header of an RTP packet. The header may include a data field indicating that the information about the strength of the received signal is included in the header.

In accordance with various embodiments of the present disclosure, the processor may determine the network condition further based upon a signal strength of the electronic device stored in a header of a Real-time Transport Protocol (RTP) packet combined with the received signal of the second electronic device.

Figure 4:
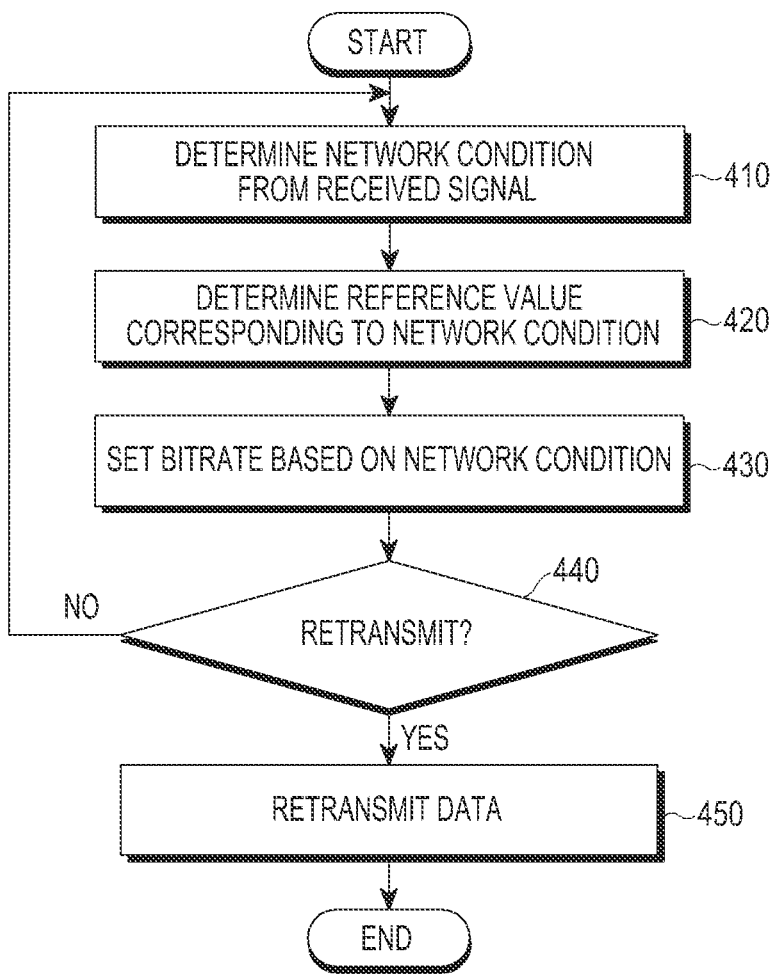
FIG. 4 is a flowchart illustrating operations for setting a bitrate in an electronic device according to an embodiment of the present disclosure.

FIG. 4 is a flowchart illustrating operations for setting a bitrate in an electronic device according to an embodiment of the present disclosure.

Referring to FIG. 4, in operation 410, an electronic device may determine a network condition from a received signal. The term 'received signal' may refer to a Received Signal Strength Indication (RSSI) or Reference Signal Received Power (RSRP), and the network condition may be classified into strong electric field, medium electric field, and weak electric filed based on the strength of the received signal.

In various embodiments, the network condition may be determined based on a reception strength of another electronic device, which is included in the header extension of the RTP packet. For example, as represented in Table 1, the current network condition may be classified into strong electric field, medium electric field, and weak electric filed based on at least one of reception strength values, such as RSRP, RSRQ, SINR, and the like.

In operation 420, the electronic device may determine a reference value corresponding to the network condition. The reference value may be a bitrate for a particular codec or a size of the RTP payload, which may be set according to a particular network condition.

In operation 430, the electronic device may set a bitrate according to the network condition. Furthermore, the electronic device may determine the size of the RTP payload allowed to be transmitted at the set bitrate.

In operation 440, in various embodiments, the electronic device may determine whether to perform retransmission. Whether to perform retransmission may be determined according to whether the RTP payload is allowed to be transmitted several times within the bandwidth allocated according to a QoS level. For example, when the bandwidth is allocated enough to retransmit the RTP payload, in operation 450, the electronic device may retransmit the data. On the other hand, when the bandwidth is allocated insufficiently to transmit the RTP payload several times, the electronic device may determine the network condition again from the received signal in operation 410.

At least one of the operations shown in FIG. 4 may be omitted in some embodiments, or at least one additional operation may be added to the operations in some other embodiments. Operations of FIG. 4 may be processed in the displayed order, or the orderings may be changed.

Figure 5:
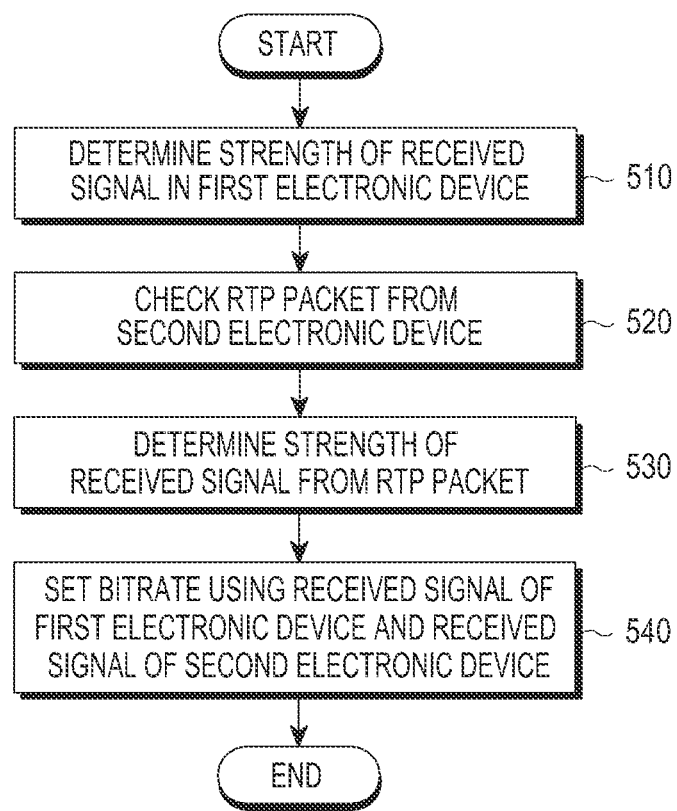
FIG. 5 is a flowchart illustrating operations for setting a bitrate in an electronic device according to other embodiments of the present disclosure.

FIG. 5 is a flowchart illustrating operations for setting a bitrate in an electronic device according to other embodiments of the present disclosure.

Referring to FIG. 5, in operation 510, a first electronic device may determine a strength of a received signal.

In operation 520, the first electronic device may receive an RTP packet transmitted from a second electronic device.

In operation 530, the first electronic device may determine a strength of a received signal of the second electronic device from the RTP packet.

In operation 540, the first electronic device may set a bitrate using the received signal of the first electronic device and the received signal of the second electronic device. In various embodiments, the bitrate may be set after a network condition is determined using the received signal of each electronic device.

At least one of the operations shown in FIG. 5 may be omitted in some embodiments, or at least one additional operation may be added to the operations in some other embodiments. Operations of FIG. 5 may be processed in the displayed order, or the orderings may be changed.

Figure 6:
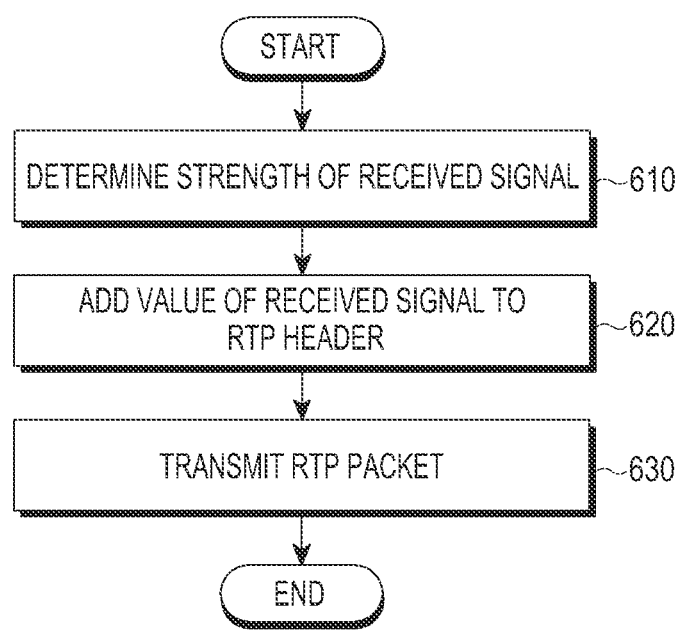
FIG. 6 is a flowchart illustrating a method for transmitting information about a received signal in an electronic device according to an embodiment of the present disclosure.

FIG. 6 is a flowchart illustrating a method for transmitting a strength of a received signal in an electronic device according to an embodiment of the present disclosure.

Referring to FIG. 6, in operation 610, an electronic device may determine a strength of a received signal.

In operation 620, the electronic device may add the value of the strength of the received signal (e.g., RSRP, RSSI, and the like) to an RTP header. For example, as the value of the strength of the received signal is added to the RTP header, the RTP header may further include a value indicating that the value of the strength of the received signal is included therein.

In operation 630, the electronic device may transmit the RTP packet to another electronic device. Upon reception of the RTP packet that includes the value of the strength of the received signal, the other electronic device may determine the network condition by taking into account the strength of a signal received by itself and the value of the strength of the received signal included in the RTP packet.

At least one of the operations shown in FIG. 6 may be omitted in some embodiments, or at least one additional operation may be added to the operations in some other embodiments. Operations of FIG. 6 may be processed in the displayed order, or the orderings may be changed.

Figure 7:
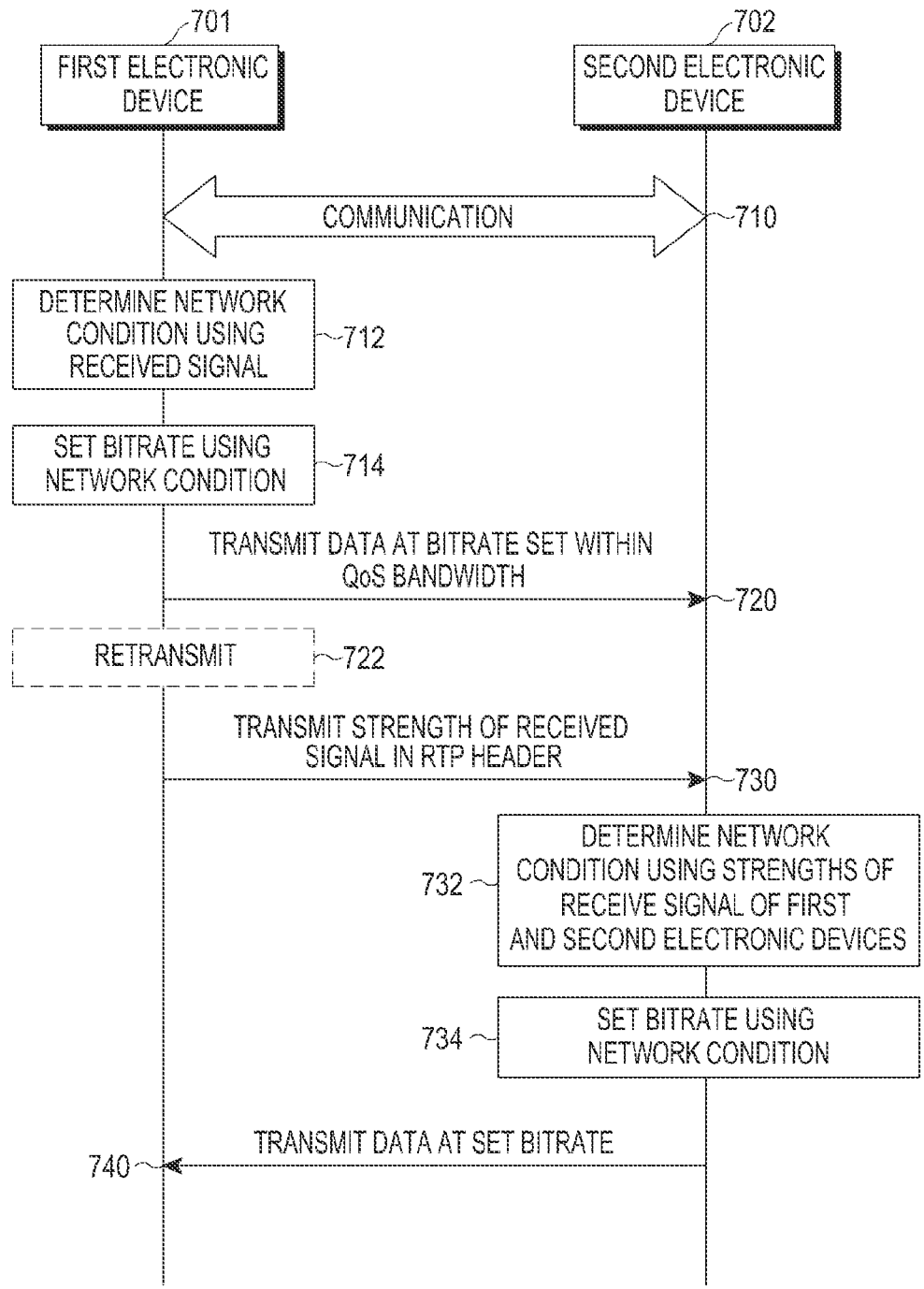
FIG. 7 is a signaling chart illustrating operations for setting a bitrate between electronic devices according to an embodiment of the present disclosure.

FIG. 7 is a signaling chart illustrating operations for setting a bitrate between electronic devices according to an embodiment of the present disclosure.

Referring to FIG. 7, in operation 710, first and second electronic devices 701 and 702 may be in communication over a network.

In operation 712, the first electronic device 701 may determine a network condition from a received signal. The first electronic device 701 may determine a strength of the received signal to determine the network condition, and the strength of the received signal may be a strength of a reference signal or a strength of a signal received through communication with the second electronic device 702.

In operation 714, the first electronic device 701 may set a bitrate using the network condition. The network condition may be classified into strong, medium, and weak electric fields. The first electronic device 701 may set a bitrate based on the classified network condition.

In operation 720, the first electronic device 701 may transmit data to the second electronic device 702 at the set bitrate within QoS bandwidth. The data for transmission may be RTP data.

In operation 722, the first electronic device 701 may retransmit the data. In the meantime, the first electronic device 701 may determine whether to perform the retransmission by taking into account the allocated QoS bandwidth and the size of the data for transmission. The size of the data may an RTP payload. For example, if the data for transmission may be transmitted several times in the allocated QoS bandwidth, the data is allowed to be retransmitted.

In operation 730, the first electronic device 701 may transmit the second electronic device 702 the strength of the received signal in the RTP header.

In operation 732, the second electronic device 702 may determine a network condition from the strength of the received signal of the first electronic device 701 and a strength of a signal received by the second electronic device 702. The second electronic device 702 may determine the strength of the received signal of the first electronic device 701 from the RTP header.

In operation 734, the second electronic device 702 may set a bitrate using the determined network condition.

In operation 740, the second electronic device 702 may transmit data at the set bitrate.

At least one of the operations shown in FIG. 7 may be omitted in some embodiments, or at least one additional operation may be added to the operations in some other embodiments. Operations of FIG. 7 may be processed in the displayed order, or the orderings may be changed.

For example, in accordance with various embodiments of the present disclosure, a method, which is performed in an electronic device, may include determining a network condition from a received signal; setting one of reference values set for corresponding network conditions as a transmission rate for the determined network condition; and transmitting a packet at the transmission rate.

In accordance with various embodiments of the present disclosure, the method may further include retransmitting the packet at least one time if the packet is allowed to be retransmitted within a preallocated bandwidth. The preallocated bandwidth may be set in advance on the QoS basis. The reference value may include a value of the bitrate for the packet, which may be set for a corresponding codec.

In various embodiments, the method may further include determining a strength of a received signal of the second electronic device from a signal transmitted from the second electronic device; and determining a network condition by taking into account a strength of the signal transmitted from the second electronic device and the strength of the received signal of the second electronic device. Information about the strength of the received signal of the second electronic device may be included in the header of an RTP packet. The header may include a data field indicating that the information about the strength of the received signal is included in the header.

In accordance with various embodiments of the present disclosure, the network condition is determined based upon a signal strength of the electronic device stored in a header of a Real-time Transport Protocol (RTP) packet combined with the received signal of the second electronic device.

Figure 8:
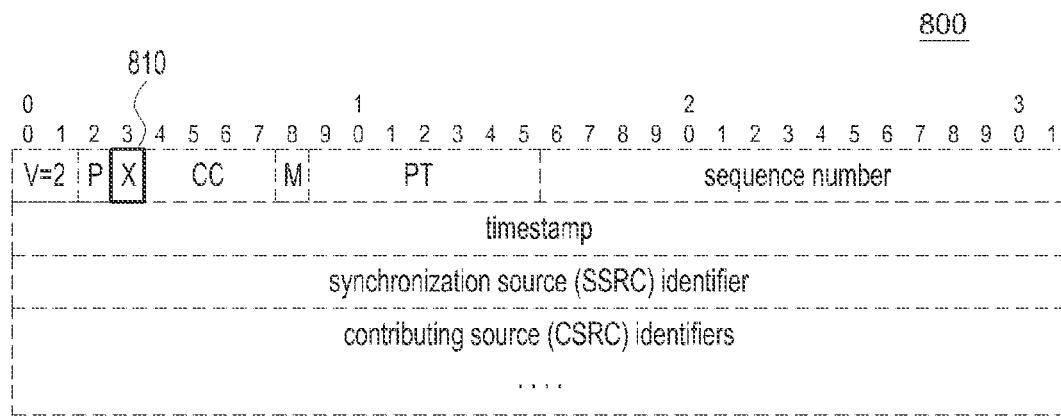
FIG. 8 illustrates a Real-time Transport Protocol (RTP) packet structure according to an embodiment of the present disclosure.

FIG. 8 illustrates an RTP packet structure according to an embodiment of the present disclosure.

Referring to FIG. 8, the RTP packet may include an RTP payload (not shown) and an RTP header 800. The RTP header 800 may include data fields for version V, padding P, extension X (810), CSRC count CC, marker M, payload type PT, sequence number, timestamp, synchronization source (SSRC) identifier, contributing sources (CSRC) identifiers.

The V may be a field for identifying a version of the RTP packet. The P may be a field for identifying whether the RTP packet includes at least one padding bit at the end of the payload. The X 810 may be a field for indicating whether a received signal or information about the received signal is included, in accordance with various embodiments of the present disclosure. For example, the X 810 may have a bit indicating "true" or "false". If the X 810 has the bit indicating "true", the electronic device may check a header extension 910 (shown in FIG. 9) in various embodiments of the present disclosure.

The CC may be a field that includes the number of CSRC identifiers of the RTP header 800. The CSRC as herein used may refer to SSRC identifiers of resources that contribute to generating the RTP header.

The M may be a field that includes a characteristic of the packet.

The PT may be a field that indicates a format of the RTP payload corresponding to the RTP header 800.

The "sequence number" may be a field that indicates a place of each RTP packet being transmitted for an electronic device that receives the RTP packet.

The "timestamp" may be a field that indicates a point in time when the first byte (octet) of the RTP packet was sampled.

The "SSRC identifier" may be a field that includes an identifier to identify a resource in the RTP session.

The "CSRC identifiers" may be a field that includes identifiers for CSRC identification.

Figure 9:
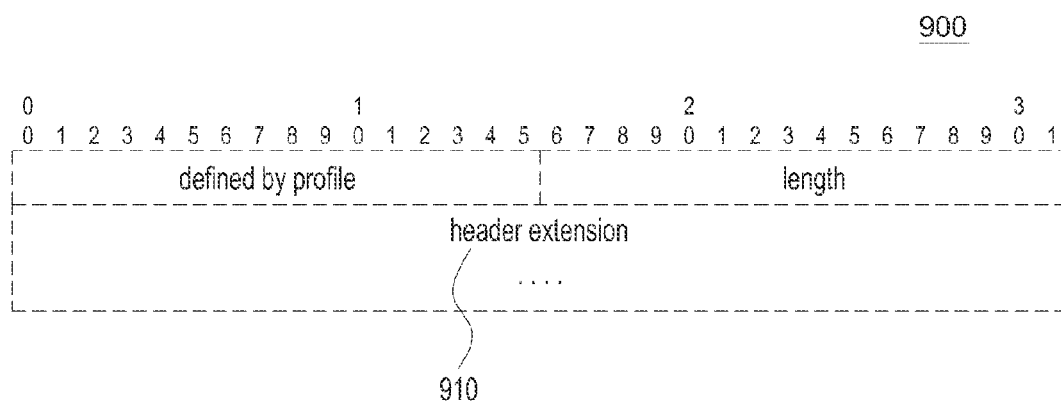
FIG. 9 illustrates an extended RTP packet structure according to embodiments of the present disclosure.

FIG. 9 illustrates an extended RTP packet structure according to an embodiment of the present disclosure.

Referring to FIG. 9, an RTP packet may further include an RTP header extension 900. In various embodiments, as the X 810 indicates "true", the electronic device may check the RTP header extension 900.

The RTP header extension 900 may include data fields of "defined by profile", "length", header extension 910, and the like. In various embodiments, the header extension 910 may include information about a strength of a received signal of an electronic device. The received signal may refer to a value of the strength of the received signal.

Figure 10:
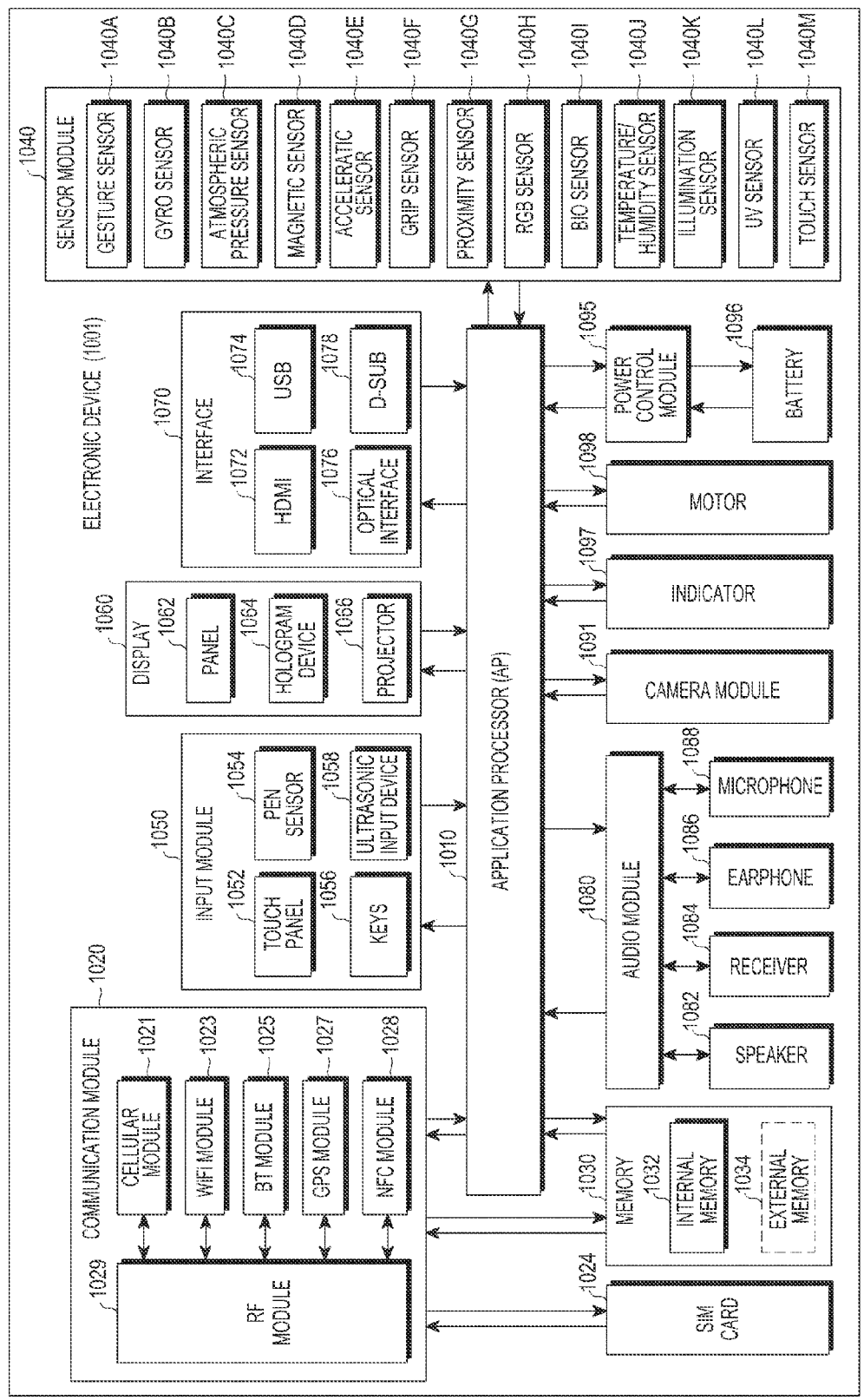
FIG. 10 is a block diagram of an electronic device according to an embodiment of the present disclosure.

FIG. 10 is a block diagram of an electronic device according to an embodiment of the present disclosure.

Referring to FIG. 10, the electronic device 1001 may constitute the entire or some of the electronic device 101 shown in FIG. 1. The electronic device 1001 may include one or more processors (e.g., Application Processors (APs)) 1010, a communication module 1020, a Subscriber Identification Module (SIM) card 1024, a memory 1030, a sensor module 1040, an input device 1050, a display 1060, an interface 1070, an audio module 1080, a camera module 1091, a power manager module 1095, a battery 1096, an indicator 1097, and a motor 1098.

The AP 1010 may control hardware and software components connected to the AP 1010 by running an operating system or application programs, and perform data processing and operation. The AP 1010 may be implemented in, for example, a System on Chip (SoC). In accordance with an embodiment, the AP 1010 may further include a Graphic Processing Unit (GPU).

The communication module 1020 (corresponding to the communication interface 160) may communicate data with other electronic devices, such as the external electronic device 104 and the server 106 connected via a network. In accordance with an embodiment, the communication module 1020 may include a cellular module 1021, a Wi-Fi module 1023, a BT module 1025, a GPS module 1027, an NFC module 1028, and a Radio Frequency (RF) module 1029.

The cellular module 1021 may provide voice calls, video calls, SMS or Internet services over a communication network, such as LTE, LTE-A, CDMA, WCDMA, UMTS, WiBro, GSM, and the like. The cellular module 1021 may also identify and authenticate an electronic device in the communication network in cooperation with the SIM card

1024. In accordance with an embodiment, the cellular module 1021 may perform at least a part of functions that the AP 1010 may provide. For example, the cellular module 1021 may perform at least a part of multimedia control function.

In an embodiment, the cellular module 1021 may include a Communication Processor (CP). The cellular module 1021 may also be implemented in, for example, an SoC. While the components of FIG. 10, such as the cellular module 1021 (e.g., a CP), the memory 1030 or the power manager module 1095 are illustrated as being separate from the AP 1010, the AP 1010 may incorporate some of the aforementioned components (e.g., the cellular module 1021) in other embodiments.

In accordance with an embodiment, the AP 1010 or the cellular module 1021 (e.g., a CP) may load a command or data received from at least one of a non-volatile memory or other components connected to the AP 1010 or the cellular module 1021, and then process the command or data. In addition, the AP 1010 or the cellular module 1021 may store data received from at least one of the other components or generated by at least one of the other components in a non-volatile memory.

The Wi-Fi module 1023, the BT module 1025, the GPS module 1027, and the NFC module 1028 may each include a processor for processing data transmitted or received through the corresponding module. While FIG. 10 illustrates each of the cellular module 1021, the Wi-Fi module 1023, the BT module 1025, the GPS module 1027, and the NFC module 1028 as a separate block, some of them (e.g., two or more of them) may be incorporated in a single Integrated Chip (IC) or an IC package in other embodiments. For example, at least some of processors corresponding to the cellular module 1021, the Wi-Fi module 1023, the BT module 1025, the GPS module 1027, and the NFC module 1028, for example, a CP of the cellular module 1021 and a Wi-Fi processor of the Wi-Fi module 1023 may be implemented in a single SoC.

The RF module 1029 may perform data communication, more specifically, RF signal communication. The RF module 1029 may include, for example, a transceiver, a Power Amp Module (PAM), a frequency filter, or a Low Noise Amplifier (LAN) (not shown). The RF module 1029 may further include some parts for wireless communication, i.e., for transmitting or receiving RF signals over the air, such as conductors, wires, and the like. While FIG. 10 illustrates that the cellular module 1021, the Wi-Fi module 1023, the BT module 1025, the GPS module 1027, and the NFC module 1028 share the single RF module 1029, at least one of them may perform RF signal communication through a separate RF module.

The SIM card 1024 may include a subscriber identification module, and may be inserted into a slot formed in a particular position in the electronic device.

The SIM card 1024 may include a unique identification information, such as Integrated Circuit Card Identifier (IC-CID), or subscriber information, such as International Mobile Subscriber Identity (IMSI).

The memory 1030 (corresponding to the memory 130) may include an internal memory 1032 or an external memory 1034. The internal memory 1032 may include, for example, at least one of a volatile memory, such as Dynamic Random Access Memory (DRAM), Static RAM (SRAM), Synchronous Dynamic RAM (SDRAM), and the like, and a non-volatile memory, such as One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, Nor flash memory, and the like.

In an embodiment, the internal memory 1032 may be a Solid State Drive (SSD). The external memory 1034 may include a flash drive, such as compact flash (CF), secure digital (SD), micro secure digital (Micro-SD), mini secure digital (Mini-SD), extreme digital (xD), memory stick, and the like. The external memory 1034 may be operationally connected to the electronic device 1001 through various interfaces. In an embodiment, the electronic device 1001 may further include a storage device (or a storage medium), such as a hard drive.

The sensor module 1040 may measure a physical quantity or convert information measured or detected by monitoring the electronic device 1001 to an electric signal. The sensor module 1040 may include at least one of a gesture sensor 1040A, a gyro sensor 1040B, an atmospheric pressure sensor 1040C, a magnetic sensor 1040D, an acceleration sensor 1740E, a grip sensor 1040F, a proximity sensor 1040G, a color sensor 1040H such as an RGB (Red, Green, Blue) sensor, a bio sensor 1040I, a temperature/humidity sensor 1040J, an illumination sensor 1040K, an Ultra Violet (UV) sensor 1040L and a Touch Sensor 1040M. Additionally or alternatively, the sensor module 740 may include an E-nose sensor, an electromyography (EMG) sensor, an electroencephalogram (EEG) sensor, an electrocardiogram (ECG) sensor, an infrared (IR) sensor, an iris sensor, a finger print sensor, and the like. The sensor module 1040 may further include a control circuit for controlling at least one or more of the sensors included in the sensor module 540.

The input device 1050 may include a touch panel 1052, a (digital) pen sensor 1054, a key 1056, or an ultrasonic input device 1058. The touch panel 1052 may recognize touch inputs in at least one of capacitive, resistive, infrared, and ultrasonic methods. The touch panel 1052 may further include a control circuit.

With the resistive method, physical contact or proximity detection may be possible. The touch panel 1052 may further include a tactile layer. In this regard, the touch panel 1052 may provide the user with a tactile response.

The (digital) pen sensor 1054 may be implemented in a way identical or similar to, for example, how a touch input of a user is received, or by using a separate sheet for recognition. The key 1056 may include, for example, a physical button, optical key or key pad. The ultrasonic input device 1058 may use an input tool that generates an ultrasonic signal and enable the electronic device 1001 to determine data by sensing the ultrasonic signal to the microphone 1088, thereby enabling wireless recognition. In an embodiment, the electronic device 1001 may receive a user input from an external electronic device, such as a computer or a server through the communication module 1020.

The display 1060 (corresponding to the display 150) may include a panel 1062, a hologram device 1064, or a projector 1066. The panel 1062 may be, for example, a Liquid Crystal Display (LCD), Active Matrix Organic Light Emitting Diodes (AMOLEDs), and the like. The panel 1062 may be implemented to be flexible, transparent, or wearable. The panel 1062 may also be incorporated with the touch panel 1052 in a unit. The hologram device 1064 may make three dimensional (3D) images (holograms) in the air by using light interference. The projector 1066 may display an image by projecting light onto a screen. The screen may be, for example, located inside or outside of the electronic device 1001. In accordance with an embodiment, the display 1060 may further include a control circuit to control the panel 1062, the hologram device 1064, or the projector 1066.

The interface 1070 may include, for example, a High Definition Multimedia Interface (HDMI) 1072, a USB 1074, an optical interface 1076, or a D-subminiature (D-sub) 1078. The interface 1070 may be included in, for example, the communication interface 160 shown in FIG. 8. Additionally or alternatively, the interface 1070 may include a Mobile High-definition Link (MHL) interface, a secure digital (SD) card/multimedia card (MMC) interface, or IrDA standard interface.

The audio module 1080 may convert a sound to an electric signal or vice versa. At least a part of the audio module 1080 may be included in, for example, the I/O interface 140 as shown in FIG. 1. The audio module 1080 may process sound information input or output through, for example, a speaker 1082, a receiver 1084, an earphone 1086, or a microphone 1088.

The camera module 1091 may be a device for capturing still images and videos, and may include, in an embodiment, one or more image sensors (e.g., front and back sensors), a lens, an Image Signal Processor (ISP), or a flash such as an LED or xenon lamp. The camera module 1091 may be controlled by cooperation of the touch sensor 1040M and the AP 1010, in accordance with various embodiments of the present disclosure. For example, the electronic device 1001 may provide a function associated with the camera module 1091 once a gesture set up by a signal detected by the touch sensor 1040M is determined.

The power manager module 1095 may manage power of the electronic device 1001. Although not shown, for example, a Power management Integrated Circuit (PMIC), a charger IC, or a battery or fuel gauge is included in the power manager module 1095. The PMIC may be mounted on, for example, an IC or an SOC. A charging method may be divided into wired and wireless charging methods. The charger IC may charge a battery and prevent overvoltage or overcurrent from being induced from a charger. In an embodiment, the charger IC may be used in at least one of a cable charging scheme and a wireless charging scheme. The wireless charging scheme may include, for example, a magnetic resonance scheme, a magnetic induction scheme, or an electromagnetic wave based scheme, and an additional circuit, such as a coil loop, a resonance circuit, a rectifier, and the like may be added for wireless charging.

The battery gauge may measure an amount of remaining power of the battery 696, a voltage, a current, or a temperature while the battery 1096 is being charged. The battery 1096 may save or generate electricity, and supply power to the electronic device 1001 with the saved or generated electricity. The battery 1096 may include, for example, a rechargeable battery or a solar battery.

The indicator 1097 may indicate a particular state of the electronic device 1001 or a part of the electronic device (e.g., the AP 1010), the particular state including, for example, a booting state, a message state, or charging state. The motor 1098 may convert electric signals to mechanical vibration. Although not shown, a processing unit for supporting mobile TV, such as a GPU may be included in the electronic device 1001. The processing unit for supporting mobile TV may process media data conforming to a standard for Digital Multimedia Broadcasting (DMB), Digital Video Broadcasting (DVB), or Media Flow.

Figure 11:
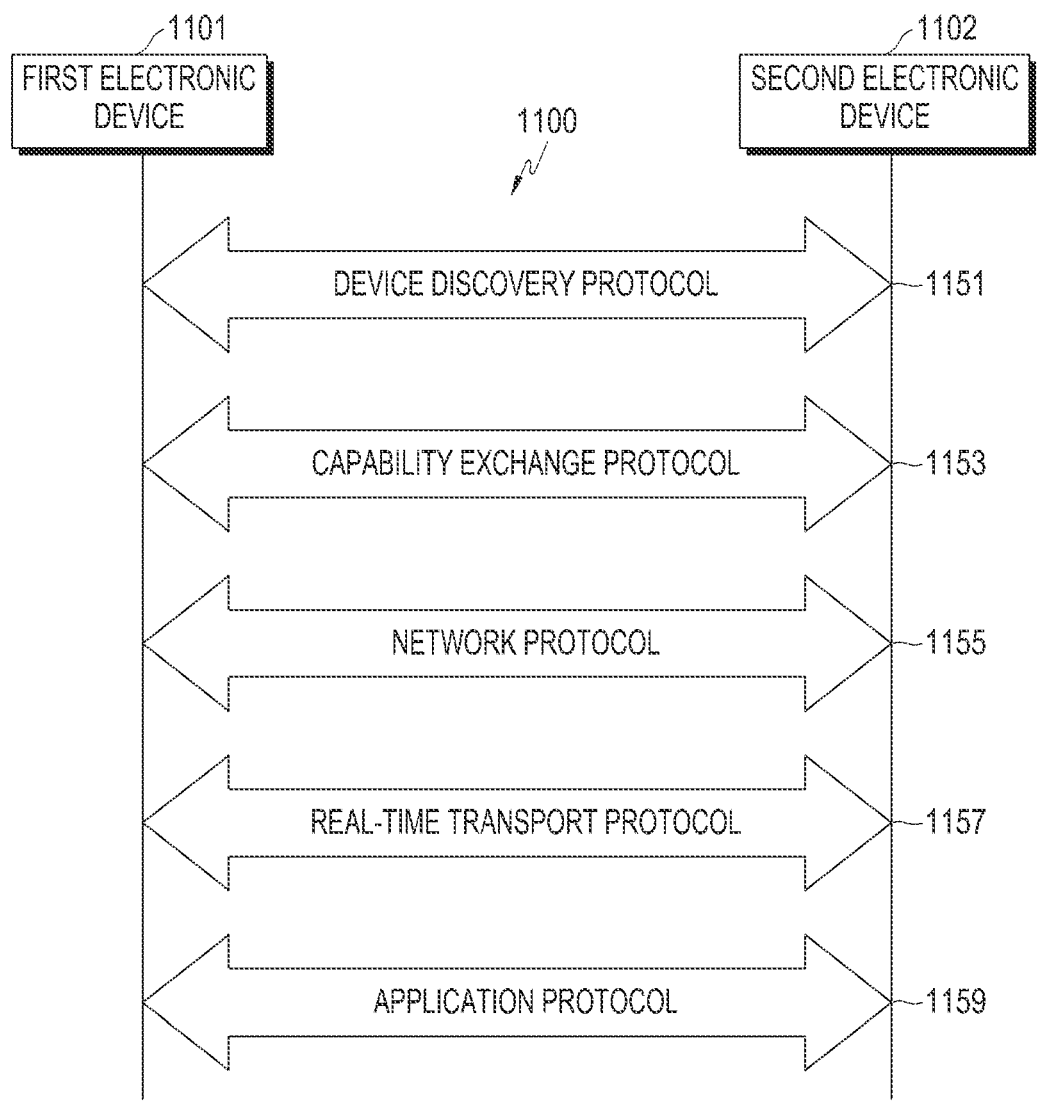
FIG. 11 shows communication protocols between multiple electronic devices according to an embodiment of the present disclosure.

FIG. 11 shows communication protocols between multiple electronic devices (e.g., first and second electronic devices 1101 and 1102) according to an embodiment of the present disclosure.

Referring to FIG. 11, the communication protocol 1100 may include a device discovery protocol 1151, a capability exchange protocol 1153, a network protocol 1155, a real-time transport protocol 1157, and an application protocol 1159.

In accordance with an embodiment, the device discovery protocol 1151 may enable each of the electronic devices (e.g., the electronic device 1101 or the second electronic device 1102) to discover an external device that may be able to communicate with the electronic device 1101 or 1102 and to connect to the discovered device. For example, with the device discovery protocol 1151, the electronic device 1101 (corresponding to the electronic device 101) may detect the second electronic device 1102 (corresponding to the external electronic device 104 that may be able to communicate with the first electronic device 1110 by means of a communication scheme, such as Wi-Fi, BT or USB that may be employed by the first electronic device 1101. The first electronic device 1101 may use the device discovery protocol 1151 to obtain and store identification information for the detected second electronic device 1102, in order to make a connection with the second electronic device 1102. The first electronic device 1101 may, for example, establish a communicative connection with the second electronic device 1102 based on the identification information.

In some embodiments, the device discovery protocol 1151 may be a protocol for mutual authentication among multiple electronic devices. For example, the first electronic device 1101 may perform an authentication procedure with the second electronic device 1102 based on the communication information for access to at least the second electronic device, such as Media Access Control (MAC) address, Universally Unique Identifier (UUID), Subsystem Identification (SSID), Information Provider (IP) address, and the like.

In accordance with an embodiment, the capability exchange protocol 1153 may be defined to exchange information associated with a service capability that may be supported by at least one of the first and second electronic devices 1101 and 1102. For example, with the capability exchange protocol 1153, the first and second electronic devices 1101 and 1102 may exchange information associated with service capabilities being currently provided by them. The exchangeable information may include identification information indicating a particular service among a multiple services that may be supported by the electronic devices 1101 and 1102. For example, the first electronic device 1101 may receive identification information for a particular service provided by the second electronic device 1102 from the second electronic device through the capability exchange protocol 1153. In this regard, the first electronic device 1101 may determine whether to support a particular service based on the received identification information.

In accordance with an embodiment, the network protocol 1155 may be defined to control data flow between electronic devices (e.g., the first and second electronic devices 1101 and 1102) connected for communication, in order for the first and second electronic devices 1101 and 1102 to provide a service in cooperation with each other. For example, at least one of the first and second electronic devices 1101 and 1102 may perform error control, data quality control and the like, using the network protocol 1155. Additionally or alternatively, the network protocol 1155 may define a transfer format of data exchanged between the first and second electronic devices 1101 and 1102. Furthermore, with the network protocol 1155, at least one of the first and second electronic devices 1101 and 1102 may manage at least a session (e.g., connect the session or terminate the session) for data exchange.

In accordance with various embodiments of the present disclosure, the real-time transport protocol 1157 may be a protocol to provide a real-time data service among multiple electronic devices (e.g., the first and second electronic devices 1101 and 1102). The real-time transport protocol 1157 may define a format of an RTP packet for delivering audio and video in real time over an IP-based network.

In accordance with an embodiment, the application protocol 1159 may be defined to provide a procedure or information for exchanging data associated with a service to be provided to a foreign electronic device. For example, with the application protocol 1159, the first electronic device 1101 (corresponding to the electronic device 101) may provide a service to the second electronic device 1102, for example, the electronic device 104 or the server 106.

In accordance with an embodiment, the communication protocol 1100 may include a standard communication protocol, a proprietary communication protocol defined by an individual or association (e.g., by a communication equipment manufacturer or a network provider), or a combination thereof.

The term 'module' as used herein may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), and Programmable Logic Arrays (PLAs) that perform some operations, which have already been known or will be developed in the future.

At least a part of the device (e.g., modules or their functions) or method (e.g., operations) may be implemented as instructions stored in a computer-readable storage medium, for example, in the form of a programming module. The instructions, when executed by one or more processor (e.g., the processor 120), may cause the processor to carry out a corresponding function. The computer-readable storage medium may be, for example, the memory 130. At least a part of the programming module may be implemented by, for example, the processor 120. At least a part of the programming module may include, for example, a module, program, routine, set of instructions, process, and the like for performing one or more functions.

The computer-readable storage medium may include a hardware device configured to store and perform program instructions (e.g., programming module), such as magnetic media such as hard discs, floppy discs, and magnetic tapes, optical media such as Compact Disc ROMs (CD-ROMs) and Digital Versatile Discs (DVDs), magneto-optical media such as floptical disks, ROMs, RAMs, Flash Memories, and the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

In accordance with various embodiments, provided is a storage medium having instructions stored thereon, the instructions, when executed by at least one processor, causing the at least one processor to perform at least one operation including: determining a network condition from a received signal; setting one of reference values set for corresponding network conditions as a transmission rate for the determined network condition; and transmitting a packet at the transmission rate.

An electronic device and method for processing packets in an IP-based network according to various embodiments of the present disclosure may set a bitrate after determining a network condition before the quality of a call service degrades, and transmit packet data at the set bitrate, thereby preventing the packet data from being delayed or lost.

According to the various embodiments of the present disclosure of the electronic device and method for processing packets in an IP-based network, waste of unused bandwidth due to excessive bandwidth allocation may be reduced by retransmitting packets several times within preallocated bandwidth.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for processing a packet in an electronic device, the method comprising:
   determining a network condition from a received signal;
   determining a predetermined transmission rate corresponding to the determined network condition;
   transmitting the packet at the predetermined transmission rate corresponding to the determined network condition; and
   retransmitting the packet at least one time within a preallocated bandwidth.

2. The method of claim 1, wherein the retransmitting further comprises integrating payloads of a plurality of voice packets into a single real-time transport protocol (RTP) packet by bundling of the payloads of the plurality of voice packets.

3. The method of claim 1, wherein the preallocated bandwidth is set in advance on a quality of service (QoS) basis.

4. The method of claim 1,
   wherein the predetermined transmission rate corresponds to one of reference values, and
   wherein the one of reference values comprises a value of a bitrate of the packet, which is set based on the bitrate and a codec.

5. The method of claim 1, further comprising:
   determining a strength of a received signal of a second electronic device from a signal transmitted from the second electronic device; and
   determining the network condition further based on the strength of the received signal of the second electronic device.

6. The method of claim 5, wherein information about the strength of the received signal of the second electronic device is included in a header of a real-time transport protocol (RTP) packet.

7. The method of claim 6, wherein the header includes a data field indicating that the strength of the received signal is included in the header.

8. The method of claim 5, wherein the network condition is determined based upon a signal strength of the electronic device stored in a header of a real-time transport protocol (RTP) packet combined with the received signal of the second electronic device.

9. An electronic device comprising:
communication circuitry configured to transmit a packet at a transmission rate; and
a processor comprising processing circuitry, and electrically connected to the communication circuitry, the processor configured to:
determine a network condition from a received signal,
determine a predetermined transmission rate corresponding to the determined network condition,
transmit the packet at the predetermined transmission rate corresponding to the determined network condition, and
retransmit the packet at least one time within a preallocated bandwidth.

10. The electronic device of claim 9, wherein the processor is further configured to integrate payloads of a plurality of voice packets into a single real-time transport protocol (RTP) packet by bundling of the payloads of the plurality of voice packets.

11. The electronic device of claim 9, wherein the preallocated bandwidth is set in advance on a quality of service (QoS) basis.

12. The electronic device of claim 9,
wherein the predetermined transmission rate corresponds to one of reference values, and
wherein the one of reference values comprises a value of a bitrate of the packet, which is set based on the bitrate and a codec.

13. The electronic device of claim 9, wherein the processor is further configured to:
determine the strength of a received signal of a second electronic device from a signal transmitted from the second electronic device through the communication module, and
determine the network condition further based on the determined strength of the received signal of the second electronic device.

14. The electronic device of claim 13, wherein the processor is further configured to include information about the strength of the received signal of the second electronic device in a header of a real-time transport protocol (RTP) packet.

15. The electronic device of claim 14, wherein the header includes a data field indicating that the strength of the received signal is included in the header.

16. The electronic device of claim 13, wherein the processor is further configured to determine the network condition further based upon a signal strength of the electronic device stored in a header of a real-time transport protocol (RTP) packet combined with the received signal of the second electronic device.

* * * * *